US005122816A

United States Patent [19]
Poeppel

[11] Patent Number: 5,122,816
[45] Date of Patent: Jun. 16, 1992

[54] PRINTER MEANS HAVING AN ELECTROTHERMALLY OPERATED PRINTING HEAD

[75] Inventor: Josef Poeppel, Mainburg, Fed. Rep. of Germany

[73] Assignee: Siemens Aktiengesellschaft, Munich, Fed. Rep. of Germany

[21] Appl. No.: 490,677

[22] PCT Filed: Aug. 5, 1988

[86] PCT No.: PCT/DE88/00484

§ 371 Date: Mar. 8, 1990

§ 102(e) Date: Mar. 8, 1990

[87] PCT Pub. No.: WO89/02367

PCT Pub. Date: Mar. 23, 1989

[30] Foreign Application Priority Data

Sep. 8, 1987 [DE] Fed. Rep. of Germany ....... 3730110

[51] Int. Cl.[5] ........................................ G01D 15/10
[52] U.S. Cl. ........................................ 346/76 PH
[58] Field of Search .............................. 346/76 PH

[56] References Cited

U.S. PATENT DOCUMENTS

| | | | |
|---|---|---|---|
| 4,550,327 | 10/1985 | Miyakawa | 346/140 R |
| 4,704,617 | 11/1987 | Sato et al. | 346/76 PH |
| 4,726,869 | 2/1988 | Matsui et al. | 156/304.2 |
| 4,819,008 | 4/1989 | Nagato et al. | 346/76 PH |
| 4,893,191 | 1/1990 | Tanaka et al. | 346/76 PH |

FOREIGN PATENT DOCUMENTS 0112474 7/1984 European Pat. Off. .

OTHER PUBLICATIONS

Japanese patent abstract, vol. 11 No. 278 (M-623) [2725] Sep. 9, 1987 Pat. No. (11) 62-77945 (A).
Japanese patent abstract vol. 11, No. 278 (M-623) [2725] Sep. 9 1987 Pat. No. (11) 62-77946 (A).
Japanese patent abstract vol. 11 No. 281 (M-624) [2728] Sep. 11, 1987 Pat. No. (11) 62-82043 (A).
Japanese patent abstract vol. 10 No. 231 (M-506) [2287] Aug. 12, 1986 Pat. No. (11) 61-64468 (A).
Japanese patent abstract vol. 10 No. 189 (M-494) [2245] Jul. 3, 1986 Pat. No. (11) 61-32769 (A).
IBM Technical Disclosure Bulletin, vol. 16, No. 5, Oct. 1973, p. 1422.

*Primary Examiner*—Benjamin R. Fuller
*Assistant Examiner*—Nancy Le

[57] ABSTRACT

A printing apparatus having an electrothermically operated printing head (10) in the form of a bubble jet ink printing head or of a thermotransfer printing head comprises a plurality of individual heating elements (11) drivable in pulsed fashion, whereby an inking agent is locally heated in character-dependent fashion via the heating elements (11) during the writing mode and is transferred onto a recording medium (12) on the basis of the triggering of an aggregate change of state. A sensor (S) that acquires the change of state of the inking agent medium at each and every heating element (11) and that can be printer-independent generates a sensor signal allocated to the point in time of the change of state. The operating frequency of the printer is controlled dependent on the sensor signal. The identification of the change of state of the inking agent corresponds to a temperature measurement of the heating measurements.

12 Claims, 3 Drawing Sheets

PRINTER MEANS HAVING AN ELECTROTHERMALLY OPERATED PRINTING HEAD

BACKGROUND OF THE INVENTION

The invention is directed to a printer means having an electrothermically operated printing head that includes a plurality of individual heating elements drivable in pulsed fashion, whereby an inking agent or a writing medium is locally heated in character dependent fashion via the heating elements in the writing mode and is transferred onto a recording medium by an aggregate status changed and is also directed to a method for the operation thereof.

Printer means of the species initially cited known either as thermotransfer printer means or as a bubble jet printer means. They are generally referred to as electrothermic or thermoelectric printers.

In thermotransfer printer means, an inking ribbon containing solid ink is locally heated in character-dependent fashion via a thermocomb having heating elements and the ink is thus melted pixel-by-pixel and is transferred onto a recording medium arranged behind the inking ribbon.

In bubble jet ink printer means as disclosed, for example, in German published application 30 12 946, a plurality of individual heating elements drivable in pulsed fashion are contained in ink channels in an ink printing head. These heating elements are flooded by a writing fluid and are locally heated in write mode. The heating elements generate local vapor bubbles in the writing fluid that effect the ejection of ink droplets out of the ink channels.

Heating elements of the electrothermically operated printers are usually composed of semiconductor resistor elements that are driven in pulsed fashion via a heating current. The writing speed obtainable with such printers is essentially limited by the degree of the residual heat of a writing event and by the elimination thereof. At high writing frequencies, the writing head heats until its function is no longer guaranteed. The basic temperature of the writing head dependent on environmental influences thereby has a significant influence.

In order to assure a reliable operation of thermoelectric printing heads, it was hitherto standard to design the level of the writing frequency to continuous operation of all writing or, respectively, heating elements and to adapt the heating duration of the heating elements to the most unfavorable operating conditions as well as printer tolerances.

Thus, German published application 36 12 469 discloses an electrothermically operated printer means wherein the operating frequency of the ink printing head is varied in accord with the temperature. The temperature of the ink printing head is thereby acquired via a temperature sensor attached in the head.

Such a temperature measurement is imprecise because it fundamentally covers only the average temperature of all heating elements but not the temperature behavior of an individual heating element. Further, such a temperature measurement has a great chronological lag compared to the heat emission of the individual heating elements. When, for example, an individual heating element is operated in continuous mode, then this quickly leads to a local overheating; the overall heat emission at the head, however, is low.

Further, TE-A33 00 395 discloses an apparatus for ejecting liquid droplets upon employment of thermal energy. In order to identify whether fluid is present at a nozzle, a conductive sensor element is arranged separately from the heating element of a nozzle at a distance therefrom.

SUMMARY OF THE INVENTION

It is therefore an object of the invention to offer a means in a printer device of the species initially cited that makes it possible to acquire or sense the temperature behavior of each and every individual heating element during printing operation.

In a printer means of the species initially cited, this object is achieved with a sensor means being provided that senses the status change of the inking agent via the heating elements themselves on the basis of the electrical values that vary at the status change.

Advantageous embodiments of the invention are provided by the sensor means sensing the change in electrical conductance of the heating elements occurring at the status change on the basis of current measurement and generating a sensor signal allocated to the point in time of the status change for identifying the point in time of the status change. Further, a switch means is provided that deactivates the heating elements dependent upon the point in time of the status change sensed by the sensor means. A measuring means may also be provided which measures the time between the start of heating and the status change. Such measuring means may include a counter drivable via heating pulses and sensor pulses. An evaluation means is provided which controls the operating frequency of the printing head dependent upon the identified status change of the inking agent and, thus, on the temperature behavior of the heating elements. An evaluation means which includes a limit value memory for accepting the limit value of the heating time is provided along with a comparator which compares the heating time offered by the measuring means to the allocated limit value of the heating time and controls the operating frequency of the printer means dependent thereon. The evaluation means may be formed so that it acquires the temperature behavior of all heating elements and controls the operating frequency of the printer head dependent upon the hating element which is most highly thermally loaded. Preferably, the printing head is in a printer head and the sensor means senses the status change of the writing fluid upon the generation of vapor bubbles and/or the condensation of vapor bubbles.

According to a method for operating an electro-thermal printer means, via a sensor means, the status change of the inking agent is acquired by measuring the current flowing in the heating element during the writing mode, the time from the excitation of the heating element up to the status change is measured, and the printer is controlled upon the measured time, particularly in view of error recognition, limiting heating duration and writing speed. This method is further comprised of, via a printer dependent sensor means, the status change of the inking agent at the heating element is acquired under standard conditions and the heating time is measured, the heating time is stored on the ink printer head in a coded form, and a sensor means is allocated to. the printer which acquires the coded heating time of every ink printing head.

In that a sense means that acquires the change of state of the inking agent is provided at every heating element, this sensor means acquiring the change in electric conductance of the heating elements occurring at the change of state on the basis of current metering and generates a sensor signal dependent thereon, a write head having a plurality of such heating elements can be optimally driven.

The acquisition of the change of state via the acquisition of the electric conductance corresponds to a selective measurement of the heating element temperature.

When, however, the degree of heating of the individual heating elements is known, then considerably higher writing frequencies can be allowed corresponding to the momentary thermic load without loosing reliability.

When the heating elements are deactivated dependent on the identified change of state in that the heating current is disconnected in time, then a lower thermic load derives and, thus, a higher writing speed derives gives simultaneous operation of all heating elements.

The writing speed can thereby be dynamically adapted to the thermic load, whereby the other temperature components such as ambient temperature, temperature of the writing fluid, etc., are also automatically taken into consideration during operation.

Since the temperature behavior of each and every individual heating element is acquired in the invention, the operating frequency of the printing head can be controlled dependent on that element that is most highly thermically stressed.

It is also possible to monitor the functionability of the individual heating element via the change of state.

Via the identification of the change of state, moreover, the heat-up time at a given voltage can be measured during the manufacture of the printing head and can be used as a balancing value for a static adaptation of the heating duration as well as the initial value for a dynamic adaptation of the heating duration.

The thermic stress can be calculated from the identified actuation sequence of the heating elements and the heating duration can be dynamically adapted.

Since the heat-up time of the heating elements until the change of state becomes shorter and shorter given increasing temperature, this heat-up time in an embodiment of the invention can be employed in a simple way for controlling the writing speed and for function monitoring.

When, for example, the mixed minimum hat-up time is downwardly transgressed as a consequence of excessive heating, whereby this can occur on the basis of a simple comparison to a stored minimum value, then this comparison event can be immediately used for controlling the operating frequency.

The minimum heat-up time that dare not be downwardly transgressed can be identified in a simple way in a test run at a defined head temperature. As warranted, a limit value that is stored and used in an evaluation circuit arrangement can be derived therefrom.

The invention is of particular significance for the identification of the change of state in ink printer means (what are referred to as bubble jet printer means). The identification of the change of state gas-fluid, i.e., of the dew point or, respectively, of the point in time of the collapse of the gas bubble, conveys the point in time for the control of the next heating cycle.

Dead times can thus be avoided and the operating behavior can be exactly acquired and optimized.

When inks having different consistencies and a different evaporation and condensation behaviors are employed in such ink printing heads, then their different temperature behavior can be identified via the identification of the condition of the point in time of the change of state and can be compensated via appropriately fashioned compensation devices.

BRIEF DESCRIPTION OF THE DRAWINGS

An embodiment of the invention is shown in the drawings and shall be set forth in greater detail below by way of example. Shown are.

DETAILED DESCRIPTION OF THE PREFERRED EMBODIMENT

In bubble jet ink printer units as disclosed, for example, in German published application 30 12 946, ink droplets are ejected by vapor bubbles. For generating a drop, ink is evaporated on an extremely small heating surface. The arising vapor bubble enlarges and expresses the ink that is still liquid out of the nozzle. The bubble sequentially condenses and collapses. The heating elements are thereby composed of ink-resistant resistor elements, preferably of semiconductor material, that are driven via a square-wave voltage pulse having a defined height. For example, this can occur by connection to a supply voltage. It can thereby be observed that the size of the ejected drop or, respectively, the speed thereof is dependent on the heating capacity, i.e., is essentially dependent on the height of the voltage pulse. Given a constant voltage pulse, the duration of the applied pulse has no influence on the size of the droplet insofar as the formation of the vapor bubble on the heating element automatically occurs when the boiling temperature of the ink is reached since a further heat application is fundamentally interrupted due to the gas formation at the heating element.

The transition, i.e., the change of state from liquid into gaseous effects a faster modification of the value of resistance or, respectively, of the electric conductance at the heating element. The same is true of the condensation time of the vapor bubble, a time at which the vapor bubble collapses and ink again envelopes the heating elements.

Figure 1:
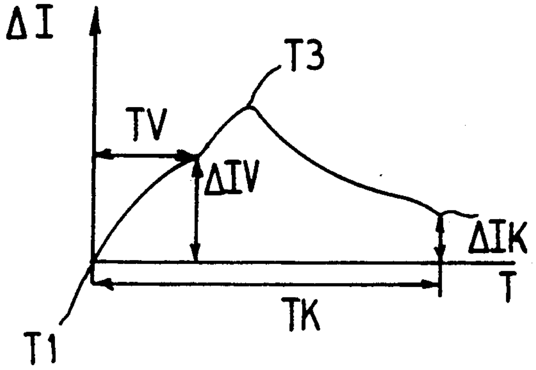
FIG. 1 a schematic diagram of the change of the electric conductance of the heating elements dependent on the time at the generation of the droplets, illustrated with the current change over the time.

This formation of the vapor bubbles and condensation and the change in electric conductance related thereto at the heating element are shown in FIG. 1. FIG. 1 fundamentally shows the standardized illustration of the variations of electric conductance of the heating element expressed by the change in current $\Delta J$ in the heating element dependent on the time T when a constant excitation pulse having a defined length is applied. The change in current $\Delta J$ is referred to the initial value of the current at the start of heating.

A square-wave pulse having a pulsed voltage height of 22.5 V and a duration of 6 $\mu s$ is applied to a semiconductor heating element of a commercially available bubble jet printing head at time T1. It can be seen from the standardized illustration that the change in current and, thus, the change in electric conductance exhibits approximately a ≧ T-curve up to the time of the formation of the vapor bubbles TV as a consequence of heating. A bend in the curve can be observed at the time the vapor bubble TV is formed since, due to the reduced heat elimination at the heating element, this now heats to a greater degree and the electric conductance thus changes faster. The point in time of evaporation is thereby defined by the evaporation time TV and the evaporation electric conductance measured via the current change ΔJV.

The pulse is disconnected at time T3, the heating element again cools off and the vapor bubble condenses at time TK. This changes the rate of change of the electric conductance and thus causes another bend in the curve of electric conductance. The condensation point in time is thereby defined by the current change ΔJK at the condensation time TK.

Figure 2:
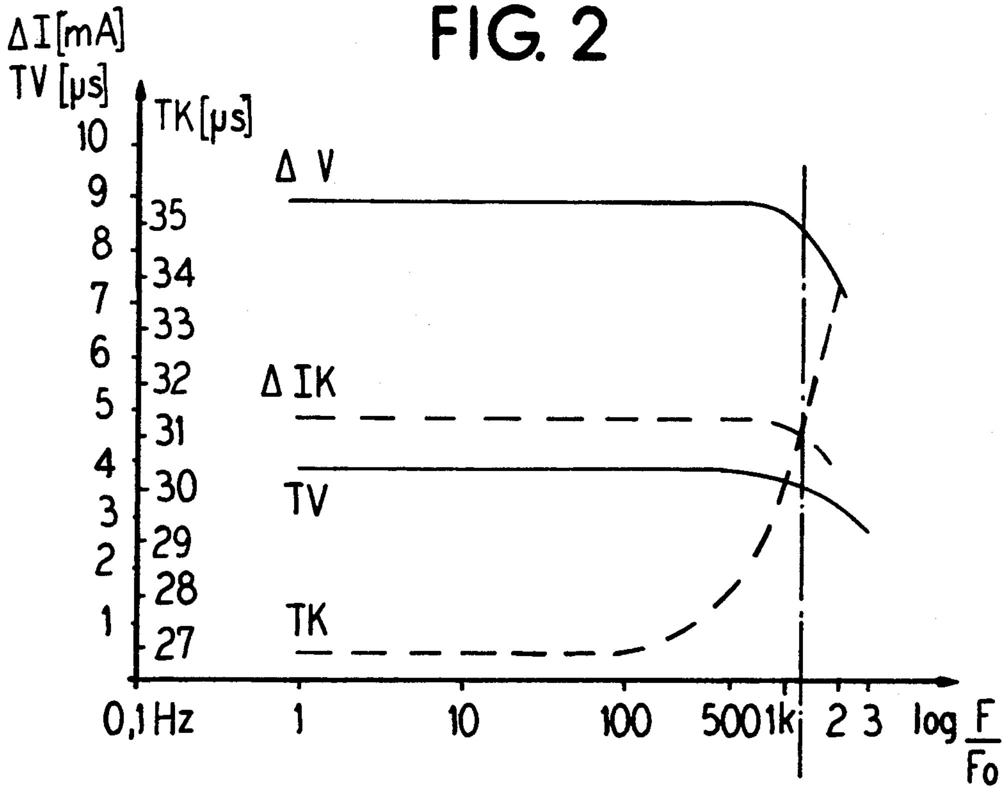
FIG. 2 a schematic diagram of the dependency of the evaporation and condensation parameters on the spraying frequency.

FIG. 2 then shows the dependency of the evaporation and condensation parameters dependent on the spraying frequency F. With the value scale 1-10, the ordinate references the current change values ΔI on the one hand and the evaporation point in time TV as well as, on the other hand, the condensation time TK with the value scale 27-35. The abscissa shows the operating frequency F in logarithmic presentation. The continuous operating frequency of the ink printing head set forth here lies at 1.2kHz (FD).

The temperature of the writing head increases with increasing spraying frequency F. The evaporation and condensation temperatures, by contrast, behave like fixed points. The spacing of the fundamental temperature from the evaporation and condensation temperatures therefore decreases at higher frequencies, this being expressed in the decreasing current or, respectively, electric conductance changes ΔIV, ΔIK of the evaporation points or, respectively, of the condensation points. Over and above this, the time TV until the evaporation occurs shortens. By contrast, the time until complete condensation TK lengthens with increasing fundamental temperature.

When, in accord with the invention, the change in electric conductance or, respectively, the change in resistance to be identified at the evaporation point in time and at the condensation point in time and, thus, the change of state of the inking agent is acquired via a sensor, then the identified evaporation time TV from the start of heating up to the evaporation point in time or, respectively, the condensation time TK is a measure for the degree of heating of the heating elements and a temperature measurement on the basis of time measurement basically occurs with the acquisition of the change of state.

In the illustrated exemplary embodiment of the invention, the change of state of the inking agent is being set forth with reference to a bubble jet printer. The invention, however, can also be employed for the acquisition of the change of state in thermotransfer printer equipment in order, for example, to be able to thus acquire the degree of heating and the operating condition of the individual heating elements of the thermocomb.

The acquisition of the change of state and, thus, fundamentally the acquisition of the temperature or, respectively, of the temperature behavior of the individual heating elements can now be exploited for a variety of control and regulation purposes at the printer.

The heating energy can be limited in a simple way by identifying the evaporation time during operation. The heating pulse can be disconnected immediately after the evaporation. It is precisely at high frequencies that an unnecessary heating of the writing head is avoided. In the illustrated example of FIG. 1, for example, the heating duration can be shortened by 2 μs. It can be shortened by 3 μs at high frequencies. This means a reduction of the thermic load of the printing head up to 40% of that originally occurring.

On the basis of a dynamic disconnection of the heating pulse, more than a 2-fold continuous writing speed can be achieved compared to the prior art given the same writing head. When one proceeds on the basis of a normal print-out of alphanumerical characters wherein 5% of the surface is actually printed, the increase in the speed obtainable on the basis of the invention amounts to approximately the factor 10. The different loading of the individual elements is already contained therein.

Further, a function check of the individual heating elements during operation is possible with the invention. When, for example, no bend in the curve of current change ΔJ (FIG. 1) representing the electric conductance occurs during heating, then this is an indication that no vapor bubble was generated. Such a function outage can then be displayed.

The invention also makes it possible to adapt the writing speed to the thermal load. For example, this can occur in that the time until the change of state is measured and the printing speed is controlled after the comparison to a limit value. The limit value can be acquired in a test run and can be correspondingly optimized. Since, moreover, the temperature flow of the heating elements is individually measured for every heating element, the writing frequency can be controlled based on that heating element that is most heavily thermically loaded.

The overall thermic load of the printing head can also be calculated from the identified sequence of actuations of the heating elements and the result can be used for speed control.

Viewed overall, the invention makes a dynamic adaptation of the writing speed possible.

This dynamic adaptation of the writing speed shall now be set forth below with reference to the block circuit diagram of FIG. 3.

A bubble jet printer not shown in detail here contains a writing head 10 having a plurality of heating elements 11 corresponding in number to the number of nozzles. Via a mechanism not shown here, the ink printing head 10 is moved line-by-line along a recording medium 12 during printing mode and, dependent on the [...]from a data source D — that, for example, can be a computer — is driven via a central controller ZS contained in the printer. The central controller ZS is constructed in a standard way, for example corresponding to that set forth in German published application 36 12 469, and controls the drive of the heating elements 11 by outputting drive pulses 13. It also controls the movement of the printer carriage and the paper feed via the motor controller MS.

The sensor means S is inventively provided for recognizing the evaporation point in time at the heating elements.

An evaluation arrangement AA is also provided, this interpreting the identified thermic condition of the individual heating elements and conveying this to a logic arrangement VA. The logic arrangement VA combines the evaluation results of all heating elements 11 and generates a signal that controls the printing speed (operating frequencies) that is conducted to the central controller ZS.

The function of the individual components is thereby as follows: the drive pulse 13 proceeding from the central controller is supplied to a counter means 14 in the evaluation arrangement AA and a counter 14 is therewith reset. The drive pulse 13 further dynamically resets a RS flip-flop 15 via the reset input R. The output of the flip-flop 15 lies at the input at an AND element 16 whose other input is also charged by the drive pulse 13. A logic signal generated in this fashion is supplied, first, to the counter 14 via an AND element 18 clocked by a crystal 17 and activates this counter 14; on the other hand, it proceeds to a differential transformer 20 amplified via a driver stage 19, as a result whereof a heating current via a voltage source 21 is generated in the heating element 11 and in a comparator resistor 22. The comparator resistor 22 has approximately the size of the resistance of the heating element 11 and, for example for compensation reasons, can be arranged in the ink printing head 10 but can also be arranged separated from the heating elements 11. The current arising in the heating element 11 is subtracted in the differential transformer 20 from the current through the comparator resistor 22 and the signal that has thus arisen is filtered via a filter network 23.

Since the electric conductance of the heating resistor 11 changes when heated, a correspondingly filtered alternating signal arises at the input of an amplifier 24. This signal that is amplified and filtered via a high-pass filter 25 is supplied to an analog comparator 26. A time filter 27 that contains a timer element 28 and a logic element 29 is arranged between the comparator 26 and the flip-flop 15.

Operated by the AND element 29, the comparator signal is not connected through to the RS flip-flop 15 until the time [Δ]t after the triggering of the heating pulse via the pulse 13, whereby a comparator signal appears at the point in time of the evaporation ("high" signal).

The RS flip-flop 15 is reset at the evaporation point in time and the counter 14 is thus stopped. The counter reading thus corresponds to the heating time. By setting the RS flip-flop 15 via the comparator signal, the driver 19 is simultaneously disconnected as, thus, is the heating element 11. The heating energy is thus limited to the required degree.

When a comparator signal does not arise, then the heating element 11 is malfunctioning and an error signal can be derived from the as yet not reset status of the flip-flop 15, namely via an appropriate error recognition arrangement 30 on the basis of comparing the pulse 13 to the output of the RS flip-flop 15. This error signal can be used for error display, for example on a display 31.

In the evaluation arrangement AA, the counter reading 14 resulting of [sic] the heating duration is compared via a comparator 32 to a limit value stored in a memory 33. This limit value stored in the memory 32 represents a minimally allowable value of the heating duration. Before the printing operation, it is identified in a test run from the heating duration in the cold condition and amounts, for example, to 90% of this heating duration. For example, this test run is carried out during manufacture of the ink printing head.

When the limit value stored in the memory 33 is downwardly transgressed, then the digital comparator 32 supplies a signal to the logic arrangement VA that is composed of a multiple OR gate in this case and that combines the individual channels, i.e., the individual evaluation arrangements of the various heating elements.

When the limit value in one channel is downwardly transgressed, then the digital comparator 32 supplies a signal to the multiple OR gate VA that switches the printing speed slower via the central controller. The remaining inputs of the OR gate are connected to the comparator outputs of the further heating elements. That heating element that is respectively most highly loaded thus defines the printing speed.

In the present exemplary embodiment, a signal corresponding to the change in electric conductance was generated in the sensor S with the assistance of a comparator resistor of a differential transformer. Instead of such analog elements, however, other elements can also be employed, for example a digital curve comparison or the like, so that the transformers can be eliminated.

Figure 3:
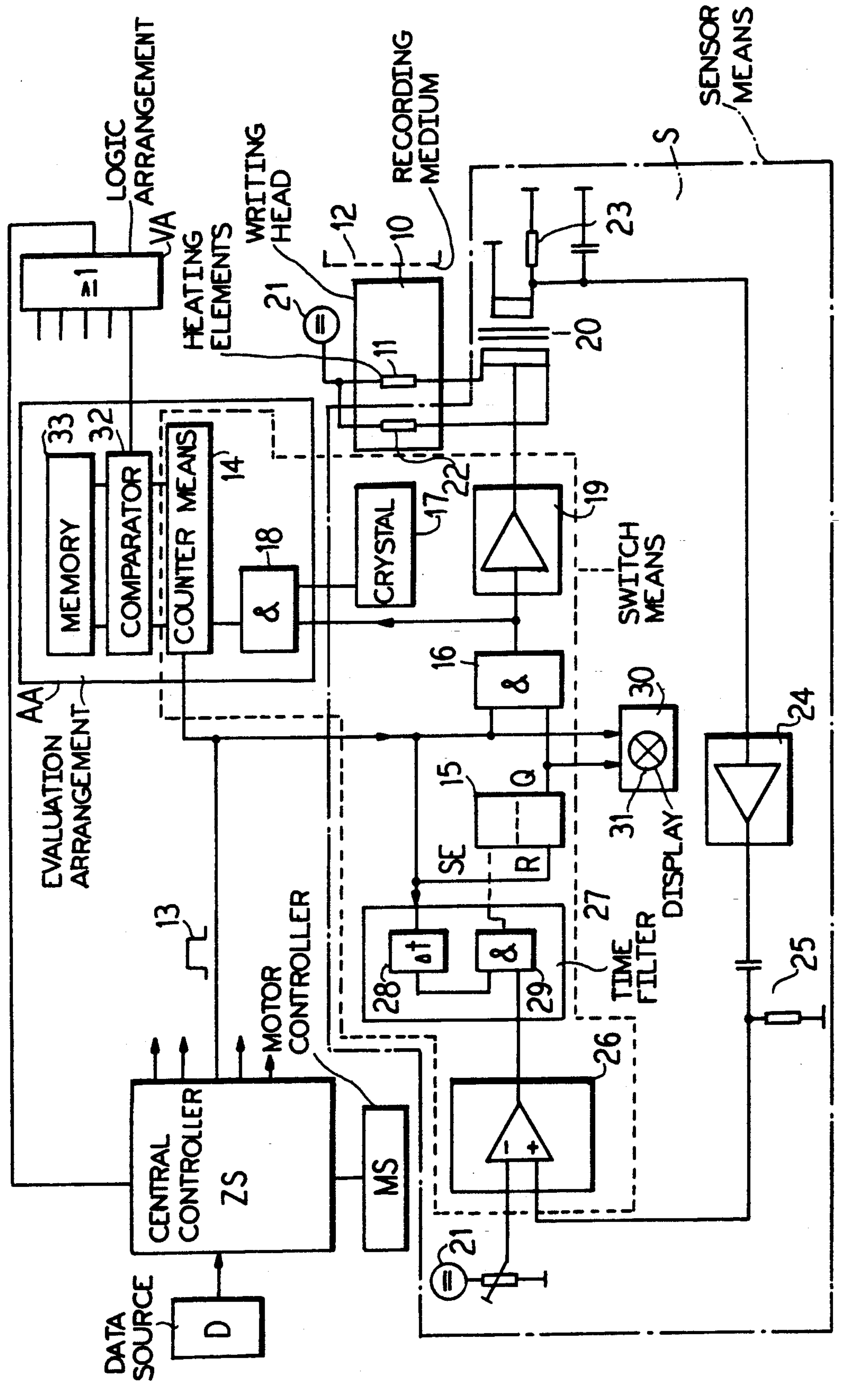
FIG. 3 a block circuit diagram of an embodiment of the invention for a bubble jet printer.
Figure 4:
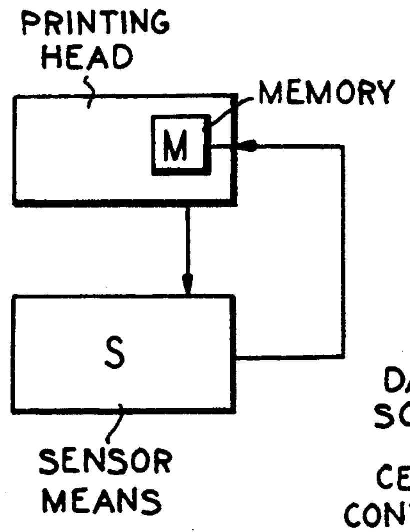
FIGS. 4 and 5 schematic illustrations of the acquisition of the change of state in manufacture with a printer-independent sensor means as well as the acquisition in the printer of the balancing values stored in the printing head.
Figure 5:
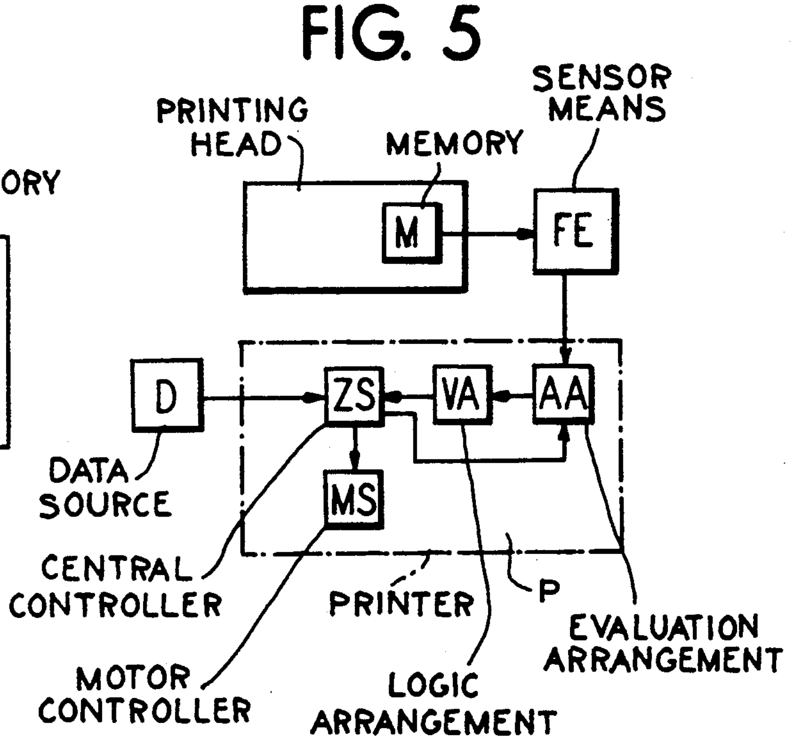

The sensor means S is integrated in the printer in the illustrated exemplary embodiment of FIG. 3. However, it is also possible to acquire a change of state of the writing medium at the heating elements with a printer-independent sensor means in the manufacture of the printing head and to allocate this to every individual printing head [sic] as balancing value. Corresponding to FIG. 4, for example, this can occur in that the change of state of inking agent at the heating element is acquired in a test writing mode during manufacture in the way set forth, being acquired with the assistance of a standard pulse on the basis of current measurement, the heating duration of the heating elements up to the change of state being thereby measured. This heating duration is then stored in coded form as balancing value on the ink printing head in some form or other, for example in a memory M or as a balancing element whose value is variable (a potentiometer or the like). After the ink printing head coded in this fashion has been built into the printer, a corresponding sensor means FE (FIG. 5) that, for example, can be composed of a standard memory-read means acquires this balancing value and supplies it to the evaluation means AA in the printer P in decoded form. When the printer is now operated with the corresponding standard pulse, this corresponds to the writing operation conditions during the test and the identified values of the change of state can be used in the way set forth for controlling the printer, for example with respect to limiting the heating duration and the writing speed. It is thereby assumed that the operating behavior of the writing head does not significantly change over time during operation.

List of Reference Characters

T Time

T1 Start of heating, beginning of excitation

TV Evaporation time or, respectively, point in time, heating time

ΔJK Current change as a measure for the condensation electric conductance

ΔIV Current change as a measure for the evaporation electric conductance

TK Condensation time or, respectively, point in time

T3 Turn-off time of the heating elements

FD Operating frequency (duration)
F Operating frequency
10 Writing head
11 Heating elements
12 Recording medium
D Data source, terminal, computer
ZS Central controller
13 Drive pulses
MS Motor controller
S Sensor means
AA Evaluation arrangement
VA Logic arrangement
14 Counter means
15 RS flip-flop
R Reset input
SE Setting input
16 AND element
17 Crystal
18 AND element
19 Driver stage
20 Differential transformer
21 Voltage source
22 Comparator resistor
23 Filter network
24 Amplifier
25 High-pass filter
26 Analog comparator
27 Time filter
28 Timer element
29 Logic element (AND element)
30 Error recognition arrangement
31 Display
32 Comparator (digital)
33 Memory
M Memory
P Printer
FE Sensor mean

I claim:

1. An electrothermically operated printing head, comprising:
- a plurality of individual heating elements;
- means for character-dependent local heating of said heating elements by heating pulses;
- means for supplying an inking agent to the heating elements and for transferring the inking agent onto a recording medium by triggering change of state in the inking agent, and
- means for acquiring the change of state of the inking agent and for driving said means for character-dependent local heating dependent on the identification of the comprising:
- a sensor means for sensing the change of state of the inking agent caused by the heating elements, said sensor means utilizing electrical values of the heating elements that vary at the change of state.

2. An electrothermically operated printing head according to claim 1, wherein, for identifying a point in electric conductance of the heating elements occurring at the change of state using current measurement and generates a sensor signal allocated to a point in time of the change of state.

3. An electrothermically operated printing head according to claim 1, further comprising:
- a switch means for deactivating the heating elements dependent on a point in time of the change of state sensed by the sensor means.

4. An electrothermically operated printing head according to claim 1, further comprising:
- a measuring means for sensing a time lying between a start of heating and the change of state.

5. An electrothermically operated printing head according to claim 4, wherein said sensor means emits sensor pulses upon sensing the change of state, and the measuring means comprises a counter drivable by the heating pulses and the sensor pulses.

6. An electrothermically operating printing head according to claim 1, further comprising:
- an evaluation means for controlling an operating frequency of the printing head dependent on the identified change of state of the inking agent and, thus, on a temperature behavior of the heating elements.

7. An electrothermically operated printing head according to claim 4, further comprising:
- an evaluation means comprises a limit value memory for accepting a limit value for a heating time; and
- a comparator means for comparing a current heating time measured by the measuring means to an allocated limit value of the heating time and controlling an operating frequency of the printing head dependent thereon.

8. An electrothermically operated printing head according to claim 1, further comprising:
- an evaluation means for sensing temperature behavior of all the heating elements and controlling an operating frequency of the printing head dependent on a one of said heating elements that is most highly thermically loaded.

9. An electrothermically operated printing head according to claim 1, wherein the printing head is an ink printer head and the sensor means senses the change of state of the inking agent upon generation of vapor bubble and/or upon condensation of vapor bubbles.

10. A method for the operation of an electrothermal printer, comprising the steps of:
- sensing, by a sensor, a change of state of an inking agent by measuring current flowing through heating elements in the printer during writing mode;
- measuring a time from excitation of the heating element up to the change of state;
- controlling the printer dependent on the measured time, particularly in view of error recognition, limiting heating duration and writing speed.

11. A method for the operation of an electrothermal printer according to claim 10, further comprising the steps of:
- sensing, by a printer-independent sensor, the change of state of the inking agent at the heating element under standard conditions and measuring a heating time;
- storing the heating time in coded form;
- sensing the coded form of the heating time by a sensor means allocated to the printer.

12. An electrothermically operated printing head, comprising:
- a plurality of individual heating elements;
- means for character-dependent local heating of said heating elements by heating pulses;
- means for contacting an inking agent with the heating elements and for transferring the inking agent onto a recording medium by triggering a change of state in the inking agent, and
- means for acquiring the change of state of the inking agent and for driving said means for character-dependent local heating dependent of identification of the change of state, said means for acquiring comprising:
  - a sensor means for sensing the change of state of the inking agent caused by the heating elements, said sensor means utilizing electrical values of the heating elements that vary at the change of state.

* * * * *